May 9, 1961  J. M. NORD  2,983,151
DAMPING APPARATUS
Filed Feb. 26, 1959  2 Sheets-Sheet 2

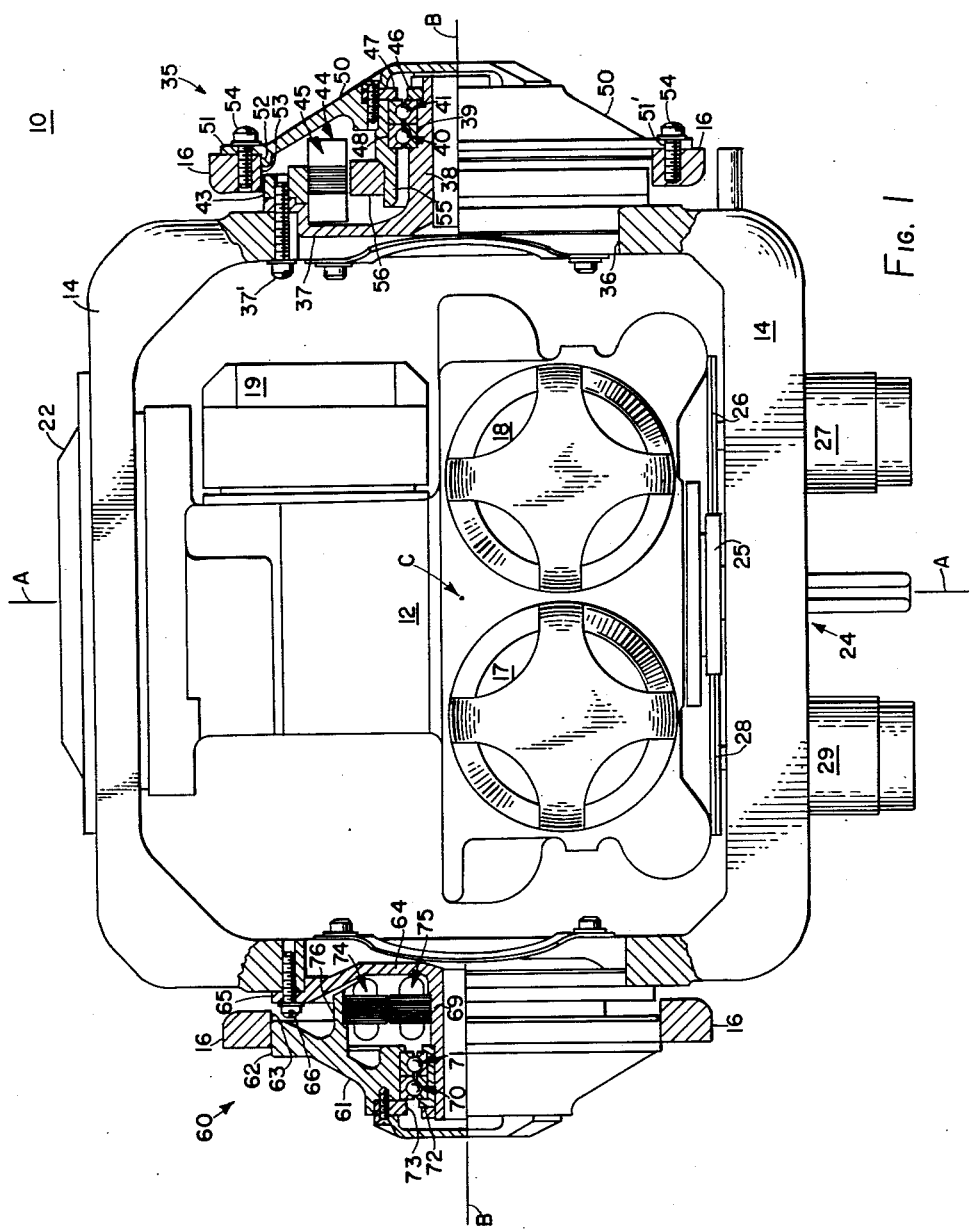

*INVENTOR.*
JAY M. NORD

BY Roger W. Jensen

ATTORNEY

United States Patent Office 2,983,151
Patented May 9, 1961

2,983,151

DAMPING APPARATUS

Jay M. Nord, Minneapolis, Minn., assignor to Minneapolis-Honeywell Regulator Company, Minneapolis, Minn., a corporation of Delaware Filed Feb. 26, 1959, Ser. No. 795,660

2 Claims. (Cl. 74—5.5)

This invention generally pertains to damping apparatus and more specifically to means for damping relative axial motion between a pair of journalled members such as in a gimbal system.

In the field of inertial instruments such as gyroscopes and accelerometers it is quite common to have a plurality of gimbals assembled relative to each other so as to provide for support about a plurality of rotational axes. In the specific field of "platforms" it is conventional to mount a plurality of control devices such as single degree of freedom gyroscopes and pendulous accelerometers on the inner element or platform and then mount the platform in turn on a plurality of gimbals for support thereof about a plurality of rotational axes. Due to the size of the inner element or platform upon which the single degree of freedom gyros and accelerometers are mounted the encompassing outer gimbals attain considerable size and mass. The outer supporting gimbals in turn have a certain resilience or compliance in response to accelerational forces. Heretofore there has been a serious problem qualifying the over-all gimbal structure from the standpoint of response to oscillatory accelerational forces. The most critical condition is when the entire assembly of the platform with its supporting gimbals is vibrated at a frequency equal to the resonant frequency of the over-all structure. At this point there is amplification of the applied input movement. The figure of merit in connection with the response of the over-all structure to the applied vibration is called the "resonant amplitude ratio" which is the ratio of the actual deflection or movement of the structure as compared to the applied movement of the means applying the resonant vibration.

Heretofore the multi-gimballed platforms have had a resonant amplitude ratio that has limited their effectiveness or range of operation.

The present invention is concerned with solving the problem associated with the high resonant amplitude ratio of the prior art multi-gimballed platforms. The prior art multi-gimballed platforms all have the common denominator of having a pair of gimbals supported for relative rotation by having a pair of axially spaced apart bearing means with the bearing means being characterized by permitting relative rotational movement between the pair of gimbals but preventing any substantial relative axial movement. The present invention provides a rotational support for a pair of gimbals wherein a pair of spaced apart bearing means are provided and connected to the two gimbals. One of the bearing means may be considered as conventional in that it is characterized by permitting relative rotation but permitting substantially no axial displacement between the two gimbals. The second rotatable connection is characterized by permitting not only relative rotation between the pair of gimbals but also being characterized by permitting a limited amount of relative axial movement between the two gimbals. Additional means are provided which may be an integral part of the axial movement permitting means for introducing a damping force for damping the axial movement. The present invention has proved very successful. In a typical platform the reduction in resonant amplitude ratio from the prior art type of configuration to the present configuration was by an improvement factor of five.

An object of this invention is to provide an improved damping apparatus.

A further object of the invention is to provide an improved multi-gimballed support with means for reducing the resonant amplitude ratio thereof.

Another object of the invention is to provide a multi-gimballed structure wherein one member is pivotally mounted relative to the second member by a pair of spaced apart rotative connections, one of which is characterized by permitting substantially no axial movement between the two members and the other of which is characterized by permitting relative axial movement between the two members and which further includes means for damping the relative axial movement so permitted.

These and other objects will become more apparent from a reading of the specification and appended claims in conjunction with the drawings in which Figure 1 is a view of a plurality of gimbals, two of which are connected together by the means embodying the teaching of the invention;

Figure 3:
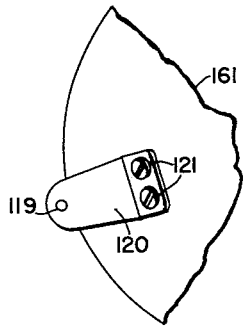
Figure 3 is a view of part of the structure of Figure 2.

Referring to Figure 1, a multi-gimballed structure generally identified by the reference numeral 10 includes an inner gimbal or platform 12, a second gimbal 14, and a third gimbal 16. The inner gimbal or platform 12 is adapted to have mounted thereon a plurality of single degree of freedom gyros and/or pendulous accelerometers. As shown in Figure 1, three single degree of freedom floated gyroscopes 17, 18 and 19 are mounted thereon with their input axis at mutual perpendicular angles. Since the details of the platform or first gimbal 12 together with its associated elements such as gyros 17—19 are not essential to an understanding of the invention, they are omitted here for simplicity. The inner gimbal or platform 12 is mounted for rotative movement relative to the second gimbal 14 by any suitable bearing means including a torque generator housing 22 supporting one end of gimbal 12 and a second bearing means generally identified by reference numeral 24 at the other end of the gimbal 12. The support of gimbal 12 by elements 22 and 24 thus define a rotational axis A between the inner gimbal or platform 12 and the second gimbal 14. A gear 25 connected to the inner gimbal 12 concentric with axis A engages a gear 26 associated with a resolver 27 mounted on the second gimbal 14. Gear 25 is also connected to a second gear 28 which in turn is connected to the rotative part of a signal generating pickoff such as a synchro pickoff 29. The rotative connection 22 may well be equivalent or similar to the type of rotative connection shown in the H. A. Dinter Patent 2,837,924, patented June 10, 1958.

The second gimbal 14 in turn is rotatably mounted relative to the third gimbal 16 for relative rotation about an axis B which is perpendicular to axis A. Third gimbal 16 in turn is mounted by means not shown for rotation about a third axis C which is perpendicular to the plane of the paper of Figure 1 and which is perpendicular to axis B.

The present invention is disclosed in connection with the rotative connection between the second gimbal 14 and the third gimbal 16. The rotative support of the second gimbal 14 by the third gimbal 16 comprises two portions the first of which is generally designated by the reference numeral 35 and the second of which is designated by the reference numeral 60. The rotative support 35 may be considered analogous to prior art types of support and "well may be of the type disclosed in the aforementioned Dinter Patent 2,837,924." It is characterized generally by permitting relative rotation between the second gimbal 14 and the third gimbal 16 about the rotative axis B. The rotative support 35 is further characterized by preventing any substantial axial movement between gimbals 14 and 16 along the axis B. The rotative connection 35 is disclosed in combination with torque motor means to be described below. The general rotative connection 35 includes the second gimbal 14 having a suitable central aperture 36 in which is secured a sleeve 37 having a hub portion 38 extending axially outward and which in turn has a reduced portion 39 for receiving the inner races of a duplex pair of anti-friction ball bearings 40 and 41. Attached to the sleeve 37 near its outer periphery is a motor stator mount 43 to which is secured an annularly shaped motor stator unit 44 having a laminated core structure and suitable winding means 45 thereon. Suitable means such as a nut 46 are provided for clamping the inner races of the bearings 40 and 41 to the hub portion 38 of the sleeve 37. The outer races of bearing means 41 and 40 are fitted into a suitable central recess 48 in an outer housing member 50. Suitable means such as a clamping ring 47 are provided for clamping the outer races of bearings 40 and 41 with respect to the outer housing 50. The outer housing 50 is provided with a circumferential flange portion 51 having a plurality of suitable apertures 51' therein and also with a short axially extending shoulder 52 adapted to fit within a circular aperture 53 in the third gimbal 16. A plurality of machine screws 54 passing through apertures 51' and threaded into gimbal 16 are used for securing the flange portion 51 of the housing 50 to the third gimbal 16. The housing member 50 has an inwardly extending hub portion 55 upon which is mounted a rotor or armature element 56 adapted to coact with the stator unit 44 of the motor means so as to apply a torque tending to rotate the second gimbal 14 relative to the third gimbal 16 upon proper energization of the winding means 45 of the motor means 44.

The rotate support 60 for the other end of the second gimbal 14 relative to the third gimbal 16 is characterized by permitting both axial and rotative movement between gimbals 14 and 16. The connection 60 is analogous to connection 35 in all respects except where connection means 35 includes the housing member 50 with the flange portion 51 securely attached to the gimbal 16 by means including the machine screws 54, the connection means 60 has an outer housing element 61 having an outer periphery 62 adapted to slidably engage a central aperture 63 in the third gimbal 16. The connection 60 further includes an inner or central member 64 having a flange portion 65 attached securely to the gimbal 14 by suitable means such as machine screws 66. The inner member 64 has a hub portion 69 upon which are mounted the inner races of a duplex pair of anti-friction bearings 70 and 71, the outer races of which are suitably mounted in the outer housing 61. Suitable means such as a nut 72 and a clamping ring 73 hold the inner and outer races 70 and 71 respectively in place.

The coupling means 60 includes means for detecting relative rotation between the gimbal 14 and the gimbal 16. The rotary motion detection means is disclosed as an induction pickoff including a stator unit 74 attached to an inwardly extending hub portion 76 of the housing member 61 and a rotor element 75 attached to hub portion 69 of the inner member 64. It will be understood that the rotary connection 60 in general may well be constructed similar to the teaching of the aforementioned Dinter patent, 2,837,924.

The peripheral portion 62 of the outer housing element 61 of the rotary connection 60 as indicated is dimensioned so as to engage the central aperture 63 in the third gimbal 16 with a fairly snug slip fit. The teaching of the present invention provides that relative axial movement along axis B between the second gimbal 14 and the third gimbal 16 is permitted by the fit between the outer housing 61 and the gimbal 16. However, the invention further provides that there will be a sufficient frictional force developed between the portion 62 of the housing 61 and the gimbal 16 in response to relative axial movement therebetween so as to provide damping action. The particular type of damping shown is of the dry friction type wherein one element directly rubs against another.

*Operation*

As indicated the rotative couplings 35 and 60 connecting the second gimbal 14 with the third gimbal 16 permit the two gimbals to rotate relative to one another along about the axis B. Rotative connection 35 was further described as being characterized by substantially preventing relative axial displacement between gimbals 14 and 16. As indicated gimbal connection 60 was further described as being characterized by having means which permit relative axial displacement between gimbals 14 and 16 and by further including means for damping the axial movement so permitted. As indicated the surfaces 62 and 63 of support 60 and gimbal 16 are in frictional engagement so that while axial movement between the gimbals 16 and 14 is permitted the movement is damped.

In operation the gimbal 14 is rotatably supported by the third gimbal 16 through the couplings 35 and 60. The torque motor means 44 is effective to produce a torque which will rotate the second gimbal 14 relative to the outer gimbal 16 and the signal generating means including stator 74 and rotor 75 are effective to detect relative rotation between the gimbals 14 and 16. In response to vibration applied to the structure 10 along the axis B, the rotative connection 35 is substantially rigid and will substantially prevent relative axial displacement between the gimbals 14 and 16 at this point. The rotative connection 60 however is relatively yieldable in the axial direction and hence any relative displacement between the gimbal 16 and gimbal 14 which would occur normally in response to the oscillatory or vibrational accelerational force is permitted to occur by the connection 60. The relative displacement occurs due to the compliances of the elements of the gimbal structure in response to the same accelerational forces. In contrast to prior art structures which had axially rigid rotating couplings on both ends of a gimbal the present invention with its axially yieldable arrangement associated with the coupling 60 permits the relative axial displacement to occur between the gimbals 14 and 16 thus preventing structural failures. The inherent damping or friction between the surfaces 62 on the housing 61 and the surface 63 on the gimbal 16 tends to dissipate the oscillatory accelerational forces and reduces the over-all resonant amplitude ratio. To explain, without the axially yieldable connection 60 the gimballed structure would have a certain amount of movement or displacement in response to a unit amount of oscillatory input movement. With the damping means provided the total amount of actual axial movement of the gimbal structure in response to the unit amount of axial movement applied is greatly reduced. As indicated, in one typical structure the resonant amplitude ratio was reduced by a factor of five.

The apparatus shown in Figure 1 has the invention applied to axis B only. It will be understood that the invention may and generally would be applied to other axes of the gimballed structure also, each axis of support being characterized by having two spaced apart rotary bearings, one of which permits and one of which prevents relative axial movement between the coacting gimbals or members, the bearing means permitting the axial movement also having associated therewith means for damping the relative axial movement.

Figures 2–7 show various modified forms of rotative couplings which in addition to permitting relative rotation between a pair of members also permit a limited amount of relative axial movement with damping means associated therewith for damping said axial movement.

Figure 2:
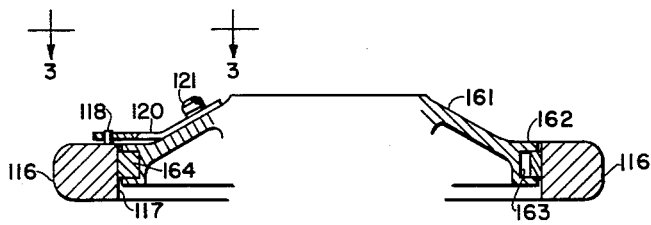
Figure 2 is a detailed view of the modified type of connection.

Figure 2 for example has an outer gimbal 116 shown with an outer housing 161 analogous to housing 61 as shown in Figure 1. It will be understood that the housing unit 161 in turn is connected to an inner gimbal not shown analogous to gimbal 14 of Figure 1. A modified type of coupling is shown between unit 161 and the gimbal 116. The housing 161 has an outer peripheral portion 162 provided with a circumferential slot 163 in which is disposed a resilient ring having a general circular outer periphery 164. The gimbal 116 has a central circular aperture 117. A pin member 118 projects from one axial face of the gimbal 116 and is adapted to project through an aperture 119 in a bracket 120 which is secured to the housing portion 161 by suitable means such as machine screws 121. The general theory of the apparatus shown in Figures 2 and 3 is generally the same as that in connection with that shown in Figure 1. The housing member 161 has associated with it a bearing means analogous to bearings 70 and 71 shown in Figure 1 for the main rotative connection between the gimbals including the gimbal 116. The resilient ring 164 is in frictional engagement with the circular aperture 117 of the gimbal 116 at all times and thus tends to dampen the relative axial movement permitted by the general coaction between the housing 161 and the gimbal 116. The bracket 120 coacting with the pin 118 prevents relative rotation between the housing 161 and the gimbal 116 but does not prevent relative axial movement therebetween. It will be understood that if we were desired to permit the housing 161 to rotate relative to the gimbal 116 then the bracket 120 and pin 118 would be eliminated. In some embodiments of the invention this could be the sole rotative connection between the gimbals.

Figure 4:
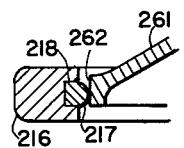
Figure 4 is a detailed view of another modified type of connection.

Figure 4 depicts a further modification of the invention wherein a gimbal 216 is depicted in part as well as a housing element 261 analogous to housing element 61 of the rotative connection 60 disclosed in Figure 1. The housing element 261 has an outer periphery 262 which is adapted to frictionally engage a resilient ring member 217 which is housed in a suitable circumferential slot 218 in the gimbal 216. Ring element 217 may be of any suitable material such as rubber. The dimensioning of the elements is such that the peripheral portion 262 of the housing element 261 is always snugly abutted against the ring element 217 so that while relative axial displacement between the housing 261 and the gimbal 216 can occur that there will be the desired amount of damping of such motion so as to reduce the over-all resonant amplitude ratio.

Figure 5:
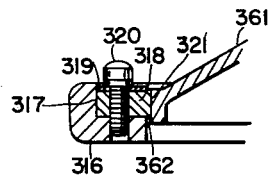
Figure 5 is a detailed view of still another type of modified connection.

Figure 5 is yet another variation or modification of the invention wherein a gimbal element 316 is provided with an axial recess 317 in which is clamped a ring of suitable resilient material (such as rubber) 318 by suitable means including a clamping washer 319 and a machine screw 320. The resilient washer 318 has an inner circular periphery 321 which is adapted to frictionally engage the outer periphery 362 of a housing element 361 analogous in function to the housing element 61 of the rotative coupling 60 as disclosed in Figure 1.

Figure 7:
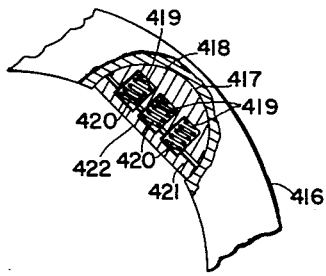
Figure 6 and Figure 7 are detailed views of still another type of modified connection, Figure 7 being a view of the structure shown in Figure 6 as viewed along section lines 7—7.
Figure 6:
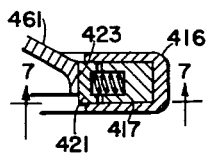

Figures 6 and 7 depict a further variation or modification of the invention. A gimbal 416 is provided with one or more inwardly opening sector-like recesses 417 in which are fitted sector shaped members 418 shown in Figure 7 to have three inwardly extending recesses 419.

Compression spring means 420 are disposed in the recesses 419 and are adapted to coact with a radially displaceable member 421 which has an inner surface 422 adapted to coact with a flat surface 423 on a housing element 461 analogous in function to the housing 61 of the rotative coupling 60 as shown in Figure 1. The spring means 420 bias the element 421 into frictional engagement with the housing element 461. The arrangement shown in Figures 6 and 7 permits relative axial displacement between the gimbal 416 and the housing element 461 and the frictional engagement between element 421 and the frame or housing 461 tends to dampen said axial movement. However the element 421 having a flat surface coacting with the flat surface 423 on the housing 461 presents relative rotation from occurring between housing 461 and the gimbal 416.

Further modifications and improvements of the invention will occur to those skilled in the art. I desire it to be understood, therefore that this invention is not limited to the particular forms shown and I intend in the appended claims to cover all modifications which do not depart from the scope of the invention.

What I claim is:

1. Apparatus of the class described comprising a gimbal member, said gimbal member being substantially ring shaped and characterized by having substantial resiliency to accelerational forces applied thereto; control means of substantial mass and size mounted on said gimbal member; a gimbal supporting member; first and second rotatable connection devices, each of said rotatable connection devices including a first portion, a second portion, and rotary bearing means between said portions; means connecting said first and second portions of said first device to said gimbal and said gimbal supporting members respectively so that said members are connected for relative rotation about an axis and so that relative axial movement between said members is substantially prevented; means connecting said first and second portions of said second device to said gimbal and said gimbal supporting members respectively so that said members are further connected for relative rotation about said axis, said second device being axially spaced from said first device, and said connecting means for said second device and said members being characterized by permitting relative axial movement between said members; and means for substantially damping said axial movement.

2. Apparatus of the class described comprising a gimbal member, said gimbal member being characterized by having substantial resiliency to accelerational forces applied thereto; a gimbal supporting member; first and second rotatable connection devices, each of said rotatable connection devices including a first portion, a second portion, and rotary bearing means between said portions; means connecting said first and second portions of said first device to said gimbal member and said gimbal supporting member respectively so that said members are connected for relative rotation about an axis and so that relative axial movement between said members is substantially prevented; and means connecting said first and second portions of said second device to said gimbal member and said gimbal supporting member respectively so that said members are further connected for relative rotation about said axis, said second device being axially spaced from said first device, and said connecting means for said second device and said members being characterized by permitting relative axial movement between said members and by including means for substantially damping said axial movement.

References Cited in the file of this patent

UNITED STATES PATENTS

| | | |
|---|---|---|
| 1,940,499 | Jones | Dec. 19, 1933 |
| 2,718,193 | Zimsky | Sept. 20, 1955 |
| 2,727,796 | Sardon | Dec. 20, 1955 |
| 2,857,765 | Kiefer | Oct. 28, 1958 |